(12) United States Patent
Huang

(10) Patent No.: US 9,914,556 B2
(45) Date of Patent: Mar. 13, 2018

(54) BOTTLE STRUCTURE

(71) Applicant: CHEN WHUA INTERNATIONAL CO., LTD., Tainan (TW)

(72) Inventor: Edward Huang, Tainan (TW)

(73) Assignee: Chen Whua International Co., Ltd., Tainan (TW)

(\*) Notice: Subject to any disclaimer, the term of this patent is extended or adjusted under 35 U.S.C. 154(b) by 161 days.

(21) Appl. No.: 14/947,033

(22) Filed: Nov. 20, 2015

(65) Prior Publication Data

US 2016/0311575 A1    Oct. 27, 2016

(30) Foreign Application Priority Data

Apr. 22, 2015    (TW) ............................. 104206126 U

(51) Int. Cl.
  *B65D 23/00*    (2006.01)
  *B62J 11/00*    (2006.01)
  *B65D 1/02*    (2006.01)

(52) U.S. Cl.
  CPC ............. *B65D 23/001* (2013.01); *B62J 11/00* (2013.01); *B65D 1/0223* (2013.01)

(58) Field of Classification Search
  CPC ............. B65D 23/001; B62J 11/00; B62J 7/02
  USPC ........ 215/383, 399, 395, 386; 248/201, 314, 248/309.1; 220/751, 694
  See application file for complete search history.

(56) References Cited

U.S. PATENT DOCUMENTS

| | | | | |
|---|---|---|---|---|
| 4,867,358 | A | * | 9/1989 | Bennis ...................... A45F 3/16 224/148.3 |
| 7,530,475 | B2 | * | 5/2009 | Ophardt ................... B65D 1/04 220/666 |
| D680,437 | S | * | 4/2013 | Bartolo .......................... D9/537 |
| 8,708,151 | B2 | * | 4/2014 | Whitten ................ G06F 1/1656 206/701 |

\* cited by examiner

*Primary Examiner* — Andrew Perreault
*Assistant Examiner* — Raven Collins
(74) *Attorney, Agent, or Firm* — Rosenberg, Klein & Lee

(57) ABSTRACT

This invention is related to a bottle structure. At least an embedded slot is disposed on a bottle body. A positioning member is disposed on the opening of the embedded slot. The inner edge of the positioning member projects toward the inner side of the opening of the embedded slot to form a stop edge. An embedded fixing part may coordinate with a spirally fixed element to lock the bottle body to a bicycle body. An embedded block of the embedded fixing part is embedded into the embedded slot of the bottle body and against the stop edge of the positioning member. A lug connected the bottom of the embedded block is located against positioning bumps disposed on inner edges of the positioning member to stably install the bottle body on the bicycle body.

5 Claims, 8 Drawing Sheets

BOTTLE STRUCTURE

BACKGROUND

Field of Invention

This invention relates to a bottle structure. More particularly, the disclosure relates to a bottle structure stably installed on a bicycle body to have an easily configured, low-cost, and light-weight bottle structure.

Description of Related Art

Bicycle has good mobility, energy saving and pollution-free characteristics and is thus very popular by people, so that more and more people using bicycles as travel and recreation tools. With the prevailing of the two-day weekend and sports, modern people often meet relatives and friends in the holidays to ride bicycles in the nature, and the purposes of sports and fitness, as well as relieving the pressure of life and work can be reached.

Sports often cause loss of water, and moderate drinking shall be needed to replenish water. Therefore, bottle holders are installed on most of the modern bicycles for placing bottles, so that bicycle riders can take the bottle for drinking water at any time. The major structure of an available bottle holder is a bent hollow frame body having two clamping arms on both sides thereof. A spirally fixing element penetrates the perforation of the bottle holder to fix the bottle holder onto a bicycle body. When using, the bottle is located by being placed in a space between the two clamping arms. However, most of the material of the available bottle holders is plastic, which is softer. Therefore, the bottle holder can be easily deformed to reduce the elastic clamping force, such that the bottle may drop from the bottle holder when a bicycle is ridden on a bumpy road. There are also metal bottle holders. The metal bottle holders are less likely to be deformed, but have heavier weights. Therefore, bottle holders made by carbon fibers are also available now. The carbon-fiber bottle holders have a better stability than plastic bottle holders and a lighter weight than metal bottle holders. Nevertheless, the cost of carbon fibers is quite high and thus the price is expensive to create a heavier economic burden to consumers.

Therefore, in view of the existing way of placing bottle in a bicycle bottle holder having many drawbacks, the inventor invents this invention by his many-year experiences of manufacture and design in related fields and ingenuity.

SUMMARY

This invention relates to a bottle structure. More particularly, the disclosure relates to a bottle structure stably installed on a bicycle body to have an easily configured, low-cost, and light-weight bottle structure.

In order to reach the implementation objectives, this inventor elaborate a bottle structure below. The bottle structure mainly comprises a bottle body having at least an embedded slot. The bottle structure is characterized in that a positioning member is disposed on an opening of the embedded slot, and an inner edge of the positioning member projects toward the inner side of the opening to form a stop edge.

In the bottle structure above, wherein the positioning member has positioning bumps formed on an inner edge thereof.

In the bottle structure above, the bottle structure further comprises an embedded fixing part having an embedded block and a lug connected to the bottom of the embedded block, wherein a pocket disposed in the center of the embedded block and a perforation is disposed in the center of the lug to communicate with the pocket, and wherein the embedded fixing part is embedded into the embedded slot of the bottle body to let the bottom of the embedded block against the stop edge and a back side of the lug against the positioning bumps of the positioning member.

In the bottle structure above, wherein the positioning member has two straight sections and a connecting section connecting the two straight sections, as well as the connecting section of the positioning member is corresponding to one end of the embedded slot of the bottle body and the two straight sections are corresponding to two sides of an opening of the embedded slot.

In light of the forgoing, the embedded fixing part may coordinate with a spirally fixed element to lock the bottle body to a bicycle body. The embedded block of the embedded fixing part is embedded into the embedded slot of the bottle body and against the stop edge of the positioning member. The lug connected the bottom of the embedded block is located against the positioning bumps to stably install the bottle body to the bicycle body. Using the bottle structure design of this invention can save the cost of buying bottle holder of bicycle. In addition, the embedded detent structure can avoid the dropping problem of the bottle caused by decreased holding force of the bottle holder. Moreover, the requirement of light weight for the bicycle body can be easily achieved.

DETAILED DESCRIPTION

For more completely and clearly disclosing the technical means and achieved effects of this invention, the detailed illustrations are set forth below. Please also refer the disclosed figures and reference numbers.

Figure 1:
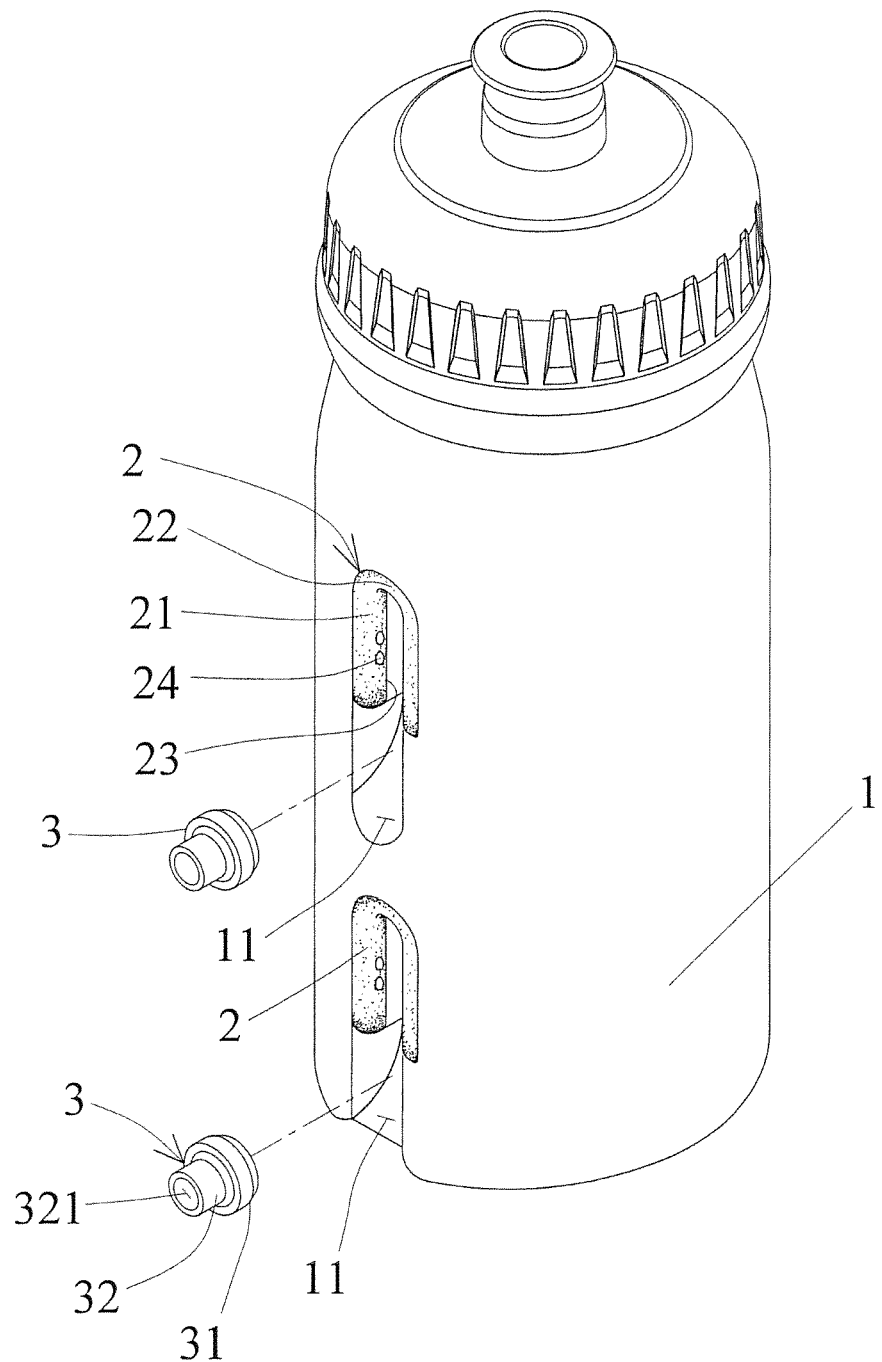
FIG. 1 is a perspective exploded view of a first embodiment of this invention.
Figure 2:
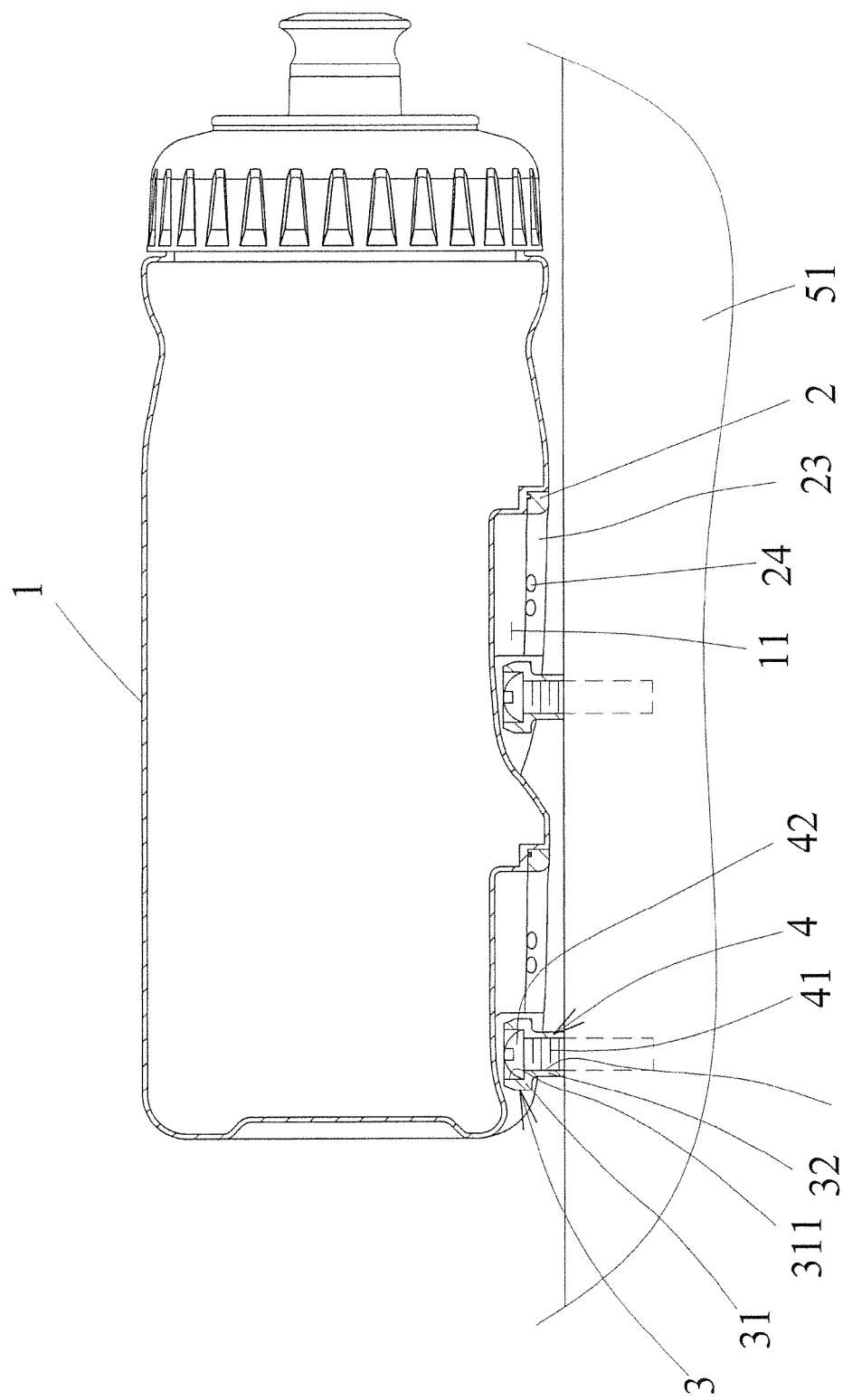
FIG. 2 is a front cross-sectional view of the first embodiment of this invention.
Figure 3:
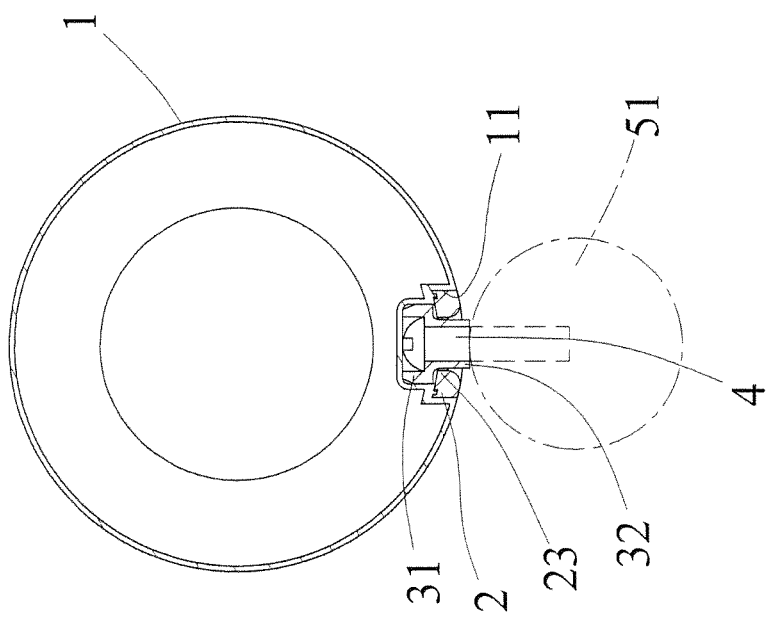
FIG. 3 is a side cross-sectional view of the first embodiment of this invention.

FIGS. 1-3 are diagrams showing a bottle structure according to this invention. The bottle structure mainly comprises a bottle body 1. At least one embedded slot 11 is disposed on one side of the bottle body 1. According to one embodiment, two embedded slots 11 arranged in tandem on one side of the bottle body 1.

At least a positioning member 2 has two straight sections 21 and a connecting section 22 connecting to one ends of the two straight sections 21. The positioning member 2 is fixedly connected to the opening of the embedded slot 11. The position of the connecting section 22 of the positioning member 2 is corresponding to one end of the embedded slot 11. The positions of the two straight sections 21 of the positioning member 2 are corresponding to two sides of the opening of the embedded slot 11. The inner edges of the two straight sections 21 and the connecting section 22 of the positioning member 2 project toward the inner side of the opening of the embedded slot 11 to form a stop edge 23. The inner edges of the two straight sections 21 of the positioning member 2 respectively have positioning bumps 24.

At least an embedded fixing part 3 comprises an embedded block 31 and a lug 32 connected to the bottom of the embedded block 31. A pocket 311 is disposed in the center of the embedded block 31, and a perforation 321 is disposed in the center of the lug 32 to communicate with the pocket 311. The embedded block 31 of the embedded fixing part 3 is embedded into the embedded slot 11 from the end that does not fixedly connect the positioning member 2, and the bottom of the embedded fixing part 3 is located against the stop edge 23 of the positioning member 2. The back side of the lug 32 of the embedded fixing part 3 is located against the positioning bumps 24 of the two straight sections 21 of the positioning member 2.

Figure 4:
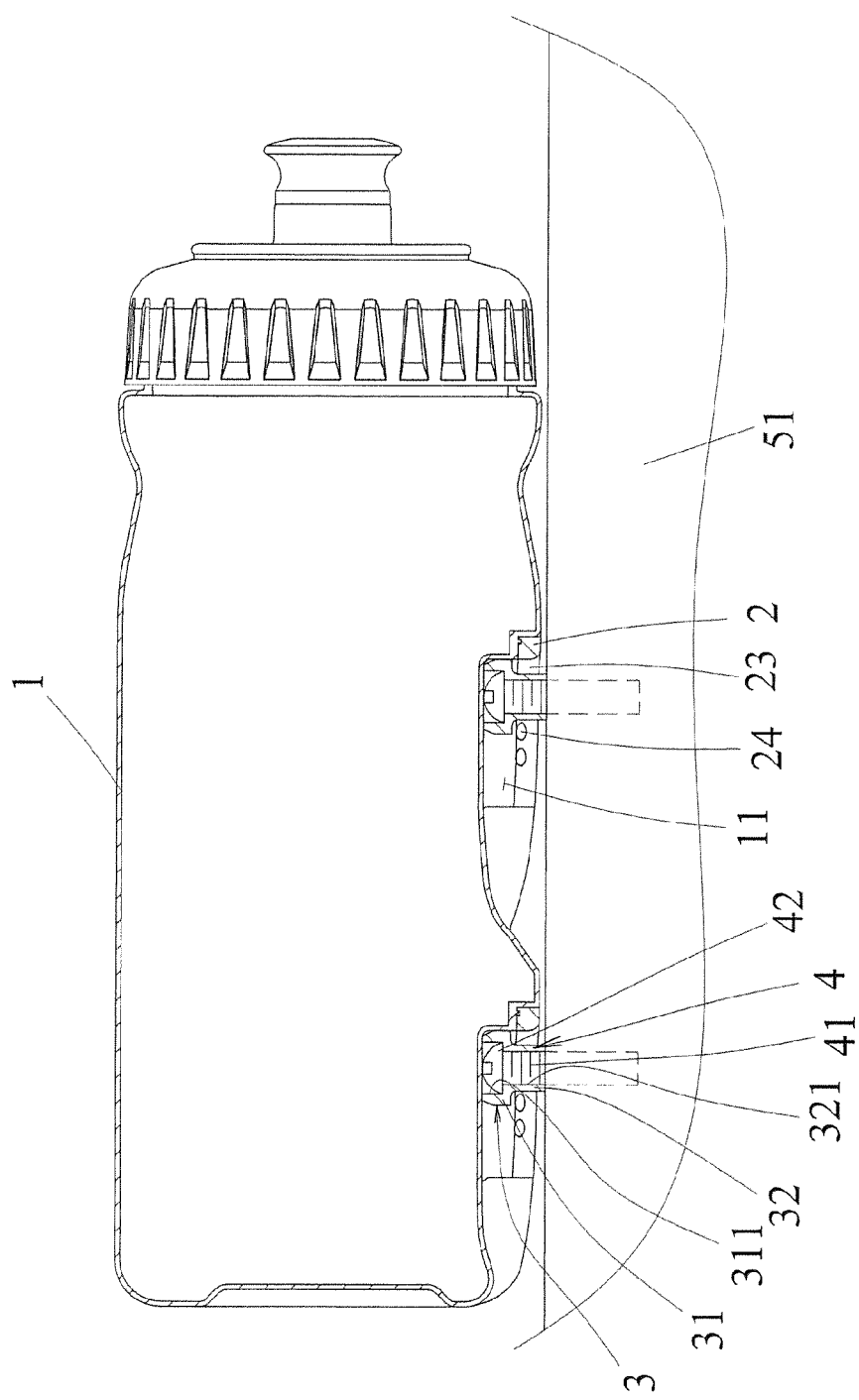
FIG. 4 is a front cross-sectional view while using the first embodiment of this invention.
Figure 5:
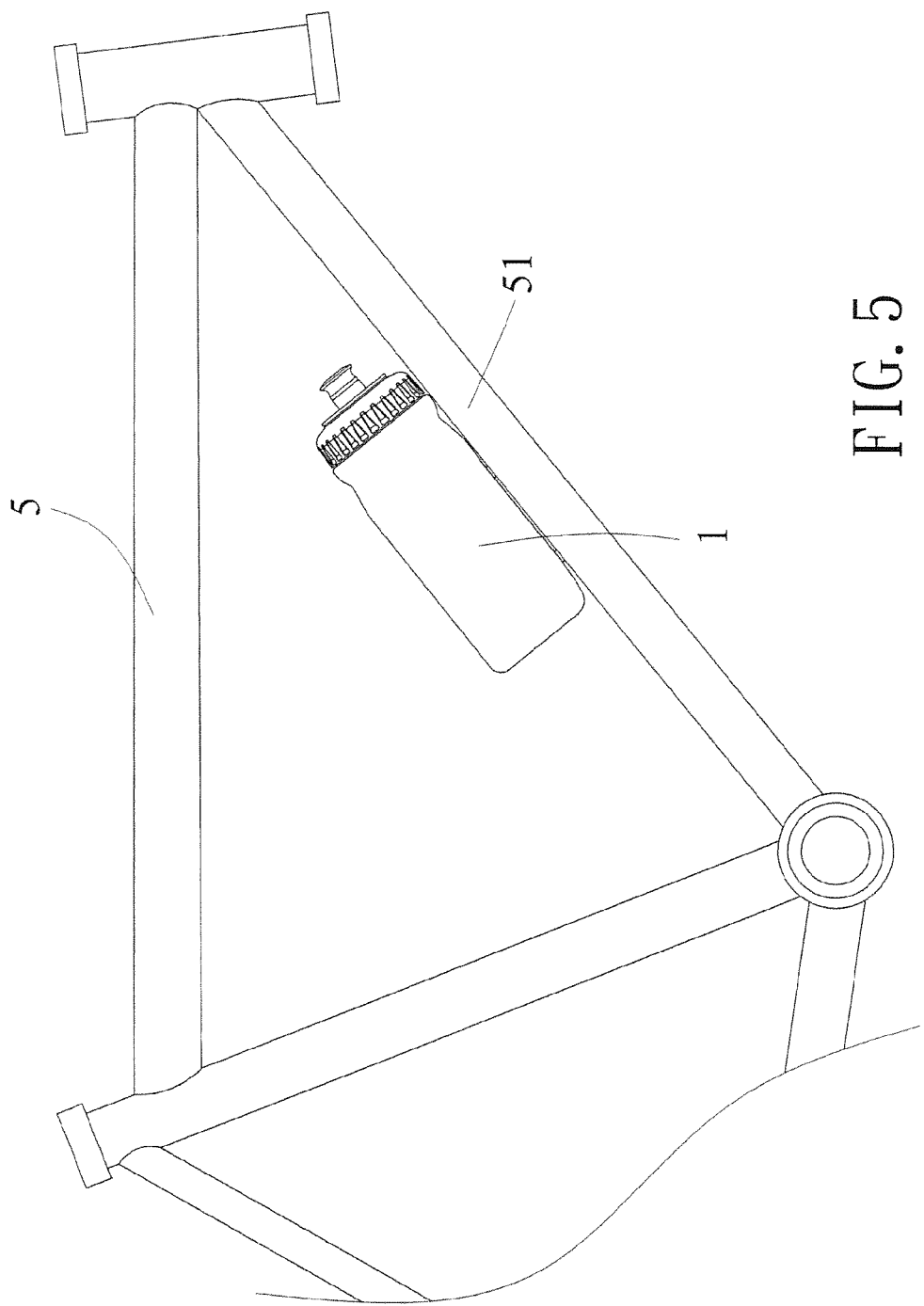
FIG. 5 is an outside view while using the first embodiment of this invention.

Accordingly, the elements described above are assembled to be used. As shown in FIGS. 4-5, a screw stem 41 of a spirally fixed element 4, such as a screw or a bolt, is used to penetrate the central perforation 321 of the lug 32 from the pocket 311 of the embedded block 31 of the embedded fixing part 3 of this invention. The screw stem 41 of the spirally fixed element 4 is extended out from the perforation 321. A head 42 of the spirally fixed element 4 is accommodated in the pocket 311 of the embedded block 31. The screw stem 41 of the spirally fixed element 4 penetrate the lug 32 of the embedded fixing part 3 to fix onto a lower tube 51 of a body of a bicycle 5. The embedded fixing part 3 of this invention is locked to the body of the bicycle 5 through the spirally fixed element 4.

Afterwards, the end that does not fixedly connect the positioning member 2 of the embedded slot 11 of the bottle body 1 is positioned to corresponding to the embedded fixing part 3 located on the body of the bicycle 5. Pleas also refer to FIG. 4. After pushing the bottle body 1 back, the embedded fixing part 3 is shifted toward the other end that fixedly connect the positioning member 2 of the embedded slot 11. When the positioning member 2 is reached, the embedded block 31 of the embedded fixing part 3 enters the top of the positioning member 2, and the bottom of the embedded block 31 is against the stop edge 23 formed by the two straight sections 21 of the positioning member 2. The lug 32 of the embedded fixing part 3 passes through the positioning bumps 24 disposed on the inner sides of the two straight sections 21 of the positioning member 2. When the embedded fixing part 3 moves to the other end of the embedded slot 11, the front edge of the embedded block 31 of the embedded fixing part 3 is against the connecting section 22 of the positioning member 2, and the back edge of the lug 32 is against the positioning bumps 24 of the positioning member 2 to locate the front and back of the bottle body 1. The top of the embedded block 31 of the embedded fixing part 3 is against the bottom of the embedded slot 11, and the bottom of the embedded block 31 is against the stop edge 23 of the positioning member 2 to locate the top and bottom of the bottle body 1. Accordingly, the bottle body 1 can be stably fixed on the lower tube 51 of the body of the bicycle 5, as shown in FIG. 5.

After a user riding the bicycle 5 for a period of time, the user will feel thirsty and want to replenish water. The user may apply force to move the bottle body 1 forward. At this time, the embedded fixing part 3 will shift from the end that fixedly connect the positioning member 2 of the embedded slot 11 of the bottle body 1 toward the other end to let the embedded fixing part 3 sequentially escape from the positioning bumps 24 of the two straight sections 21 of the positioning member 2 and the stop edge 23. After reaching the other end of the embedded slot 11, the bottle body 1 can be separated from the embedded fixing part 3 and be removed from the body of the bicycle 5 to drink the water inside of the bottle body 1. Using the bottle structure of this invention can save the cost of buying bicycle bottle holders. In addition, the bottle body 1 is installed on the body of the bicycle 5 by an embedded detent structure in this invention, so that the dropping problem of the bottle caused by vibrations in case of fixing the bottle body 1 on the body of the bicycle 5 by elastic clamping force of an easily-deformed bottle holder can be avoided. Moreover, this invention can avoid the bottle holder from increasing the body weight of the bicycle 5 to meet the requirement of light weight for the modern bicycle products.

Figure 6:
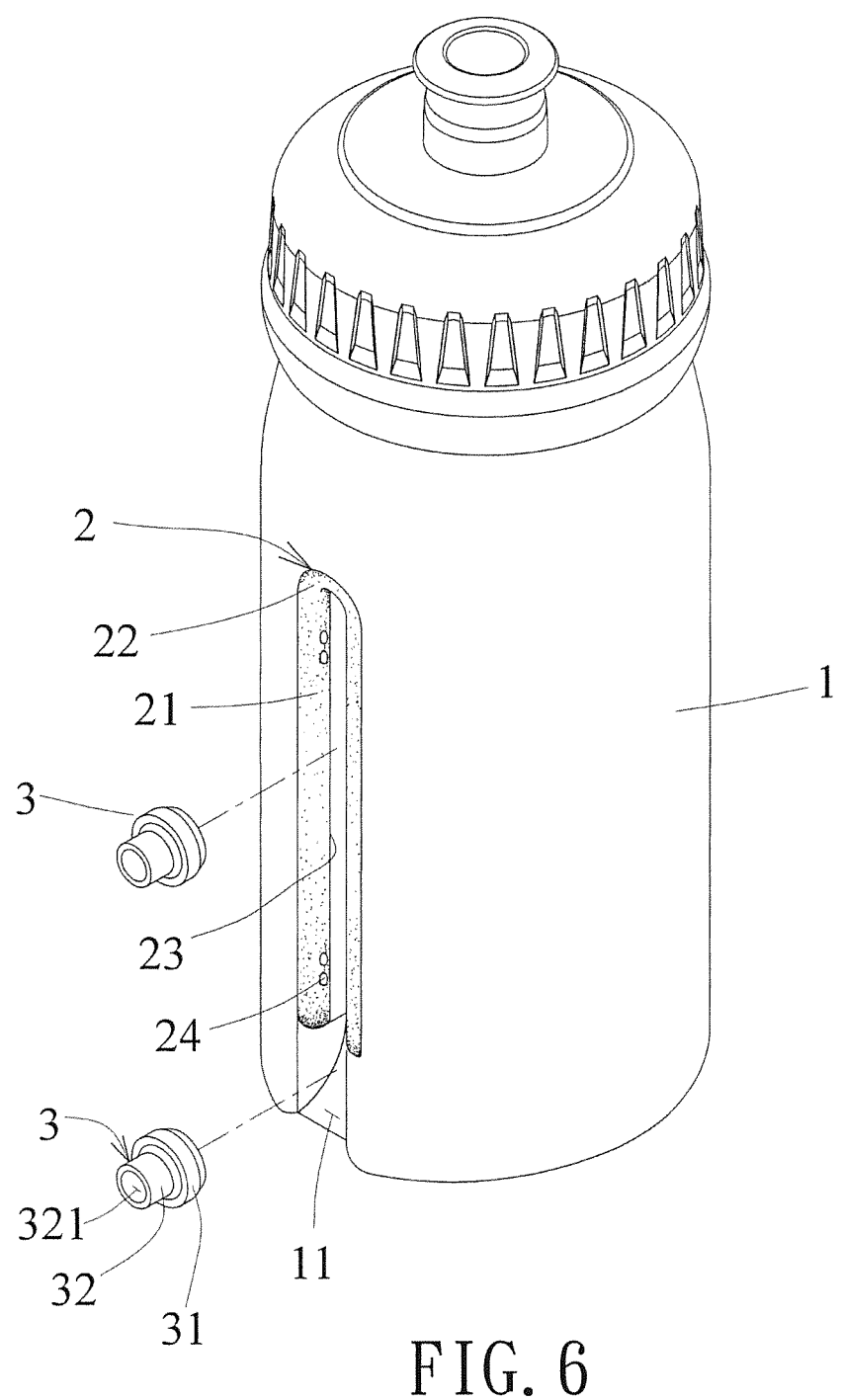
FIG. 6 is a perspective exploded view of a second embodiment of this invention.
Figure 7:
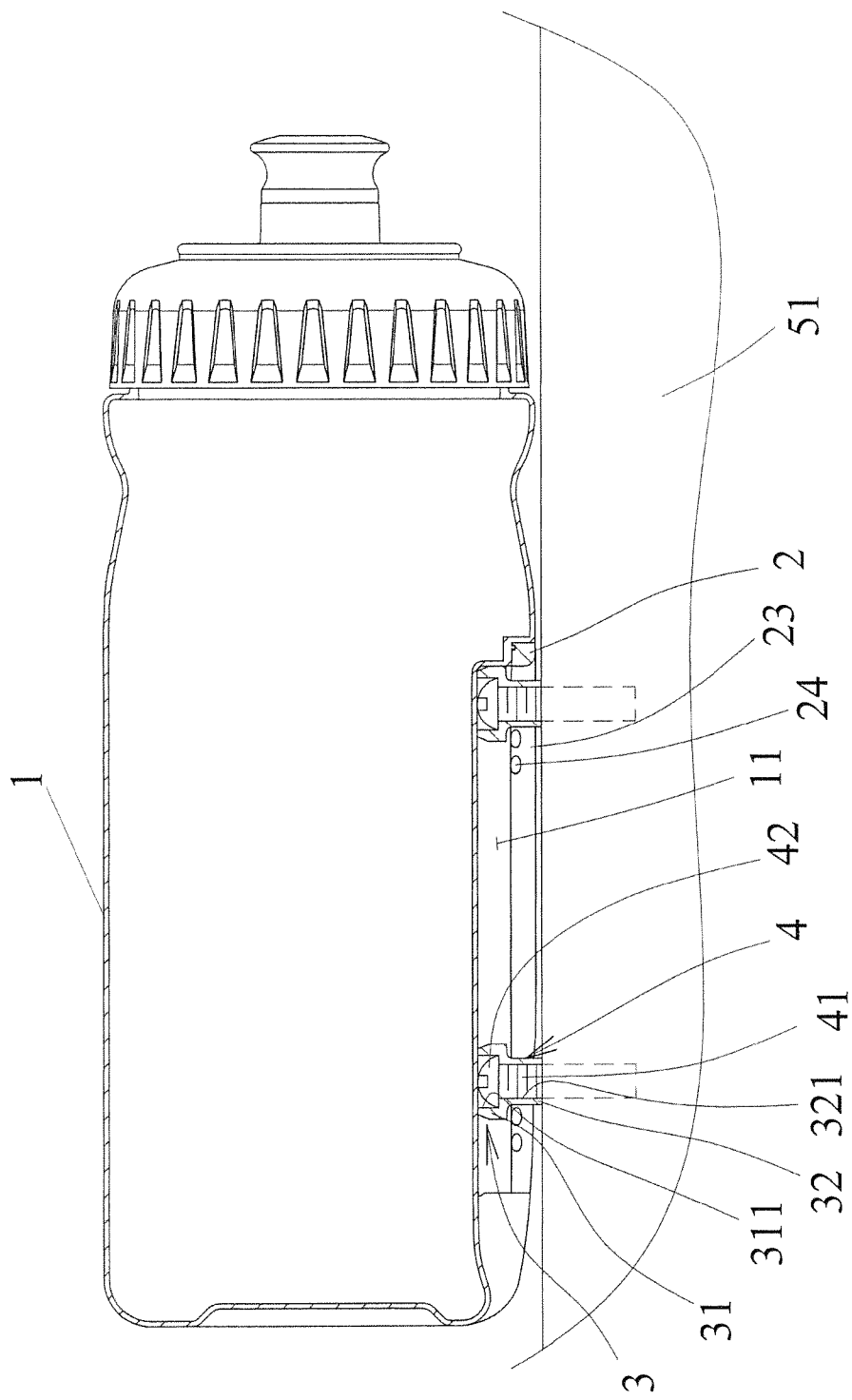
FIG. 7 is a front cross-sectional view of the second embodiment of this invention.
Figure 8:
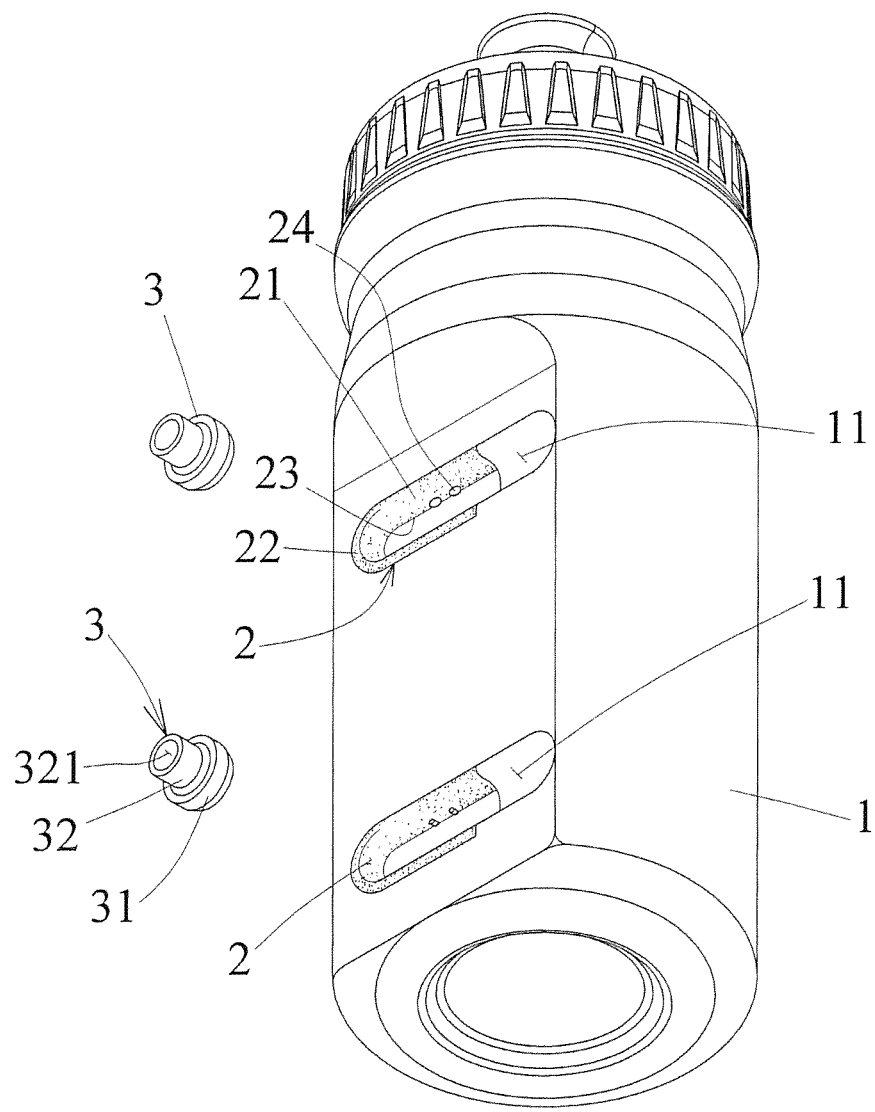
FIG. 8 is a perspective exploded view of a third embodiment of this invention.

The above embodiments or figures are not used to limit the implemented bottle structure of this invention. In this invention, in addition to the embedded slots 11 arranged in tandem on one side of the bottle body 1, one embedded slot 11 also can be disposed on one side of the embedded slot 11, as shown in FIGS. 6 and 7. The positioning member 2 is corresponding to the opening of the embedded slot 11, and some positioning bumps 24 are located on two straight sections 21 of the positioning member 2 to removably fix the bottle body 1 by the positioning member 2 and the embedded fixing part 3. Please also refer to FIG. 8. The formation direction of the embedded slot 11 is not only in the axial direction, but also may be in the radial direction. Moreover, the bottle structure also can omit the embedded fixing part 3 to directly connect the spirally fixed element 4, so that the head 42 of the spirally fixed element 4 is embedded in the embedded slot 11 of the bottle body 1. Therefore, the head 42 is against the stop edge 23 of the positioning member 2, and the screw stem 41 of the spirally fixed element 4 is against the positioning bumps 24 of the positioning member 2. Proper modifications and variations made by persons having ordinary skills in the art should be viewed as within the patent scope of this invention.

What is claimed is:

1. A bottle structure comprising a bottle body having at least an embedded slot, the bottle structure is characterized in that:
   a positioning member is disposed on an opening of the embedded slot, and an inner edge of the positioning member projects toward an inner side of the opening to form a stop edge, the positioning member having positioning bumps formed on an inner edge thereof; and
   an embedded fixing part having an embedded block and a lug connected to the bottom of the embedded block, wherein a pocket is disposed in the center of the embedded block and a perforation is disposed in the center of the lug to communicate with the pocket, and wherein the embedded fixing part is embedded into the embedded slot of the bottle body to let the bottom of the embedded block against the stop edge and a back side of the lug against the positioning bumps of the positioning member.

2. The bottle structure of claim 1, wherein the positioning member has two straight sections and a connecting section connecting the two straight sections, and the connecting section of the positioning member is corresponding to one end of the embedded slot of the bottle body and the two straight sections are corresponding to two sides of an opening of the embedded slot.

3. The bottle structure of claim 1, wherein the embedded slot is formed in an axial direction or in a radial direction of the bottle body.

4. A bottle structure comprising a bottle body having at least an embedded slot, the bottle structure is characterized in that:
- a positioning member is disposed on an opening of the embedded slot, and an inner edge of the positioning member projects toward an inner side of the opening to form a stop edge, the positioning member having two straight sections and a connecting section connecting the two straight sections, and the connecting section of the positioning member corresponds to one end of the embedded slot of the bottle body and the two straight sections correspond to two sides of an opening of the embedded slot, the positioning member further having positioning bumps formed on inner edges of the two straight sections, and
- an embedded fixing part having an embedded block and a lug connected to the bottom of the embedded block, wherein a pocket is disposed in the center of the embedded block and a perforation is disposed in the center of the lug to communicate with the pocket, wherein the embedded fixing part is embedded in the embedded slot of the bottle body to make the bottom of the embedded block against the stop edge and a back side of the lug against the positioning bumps of the positioning member.

5. The bottle structure of claim 4, wherein the embedded slot is formed in an axial direction or in a radial direction of the bottle body.

\* \* \* \* \*